(12) United States Patent
Harle

(10) Patent No.: US 8,327,894 B2
(45) Date of Patent: Dec. 11, 2012

(54) TIRE FOR CARRIER VEHICLE

(75) Inventor: François Harle, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 841 days.

(21) Appl. No.: 12/298,683

(22) PCT Filed: Apr. 25, 2007

(86) PCT No.: PCT/EP2007/054066
§ 371 (c)(1),
(2), (4) Date: Oct. 27, 2008

(87) PCT Pub. No.: WO2007/122252
PCT Pub. Date: Nov. 1, 2007

(65) Prior Publication Data
US 2009/0065116 A1    Mar. 12, 2009

(30) Foreign Application Priority Data
Apr. 26, 2006  (FR) .................................. 06 03768

(51) Int. Cl.
*B60C 11/13*  (2006.01)
*B60C 11/04*  (2006.01)
(52) U.S. Cl. ......... 152/209.18; 152/209.25; 152/209.27; 152/901

(58) Field of Classification Search ............... 152/209.1, 152/209.2, 209.3, 209.8, 209.9, 209.15, 209.18, 152/209.25, 209.27, 901
See application file for complete search history.

(56) References Cited

U.S. PATENT DOCUMENTS

| | | | |
|---|---|---|---|
| 4,230,512 A * | 10/1980 | Makino et al. ........... | 152/209.21 |
| RE30,527 E * | 2/1981 | Verdier .................... | 152/209.27 |
| 4,515,197 A * | 5/1985 | Motomura et al. ...... | 152/209.21 |
| 4,854,358 A * | 8/1989 | Takeuchi ................. | 152/209.18 |
| 4,905,748 A * | 3/1990 | Kukimoto et al. ........ | 152/209.5 |
| 5,240,053 A * | 8/1993 | Baumhofer et al. ..... | 152/209.22 |
| 5,358,020 A * | 10/1994 | Haas ........................ | 152/209.11 |
| D492,246 S * | 6/2004 | Salvan et al. ............ | D12/567 |
| 7,281,555 B2 * | 10/2007 | Ono ......................... | 152/209.27 |

FOREIGN PATENT DOCUMENTS

| | | |
|---|---|---|
| EP | 0 227 322 A2 | 7/1987 |
| EP | 0 282 252 A2 | 9/1988 |
| JP | 2004 009771 | 1/2004 |

* cited by examiner

*Primary Examiner* — Eric Hug
(74) *Attorney, Agent, or Firm* — Cozen O'Connor

(57) ABSTRACT

A radial tire for a handling vehicle, comprising a tread in which the thickness in the radial direction in the circumferential mid-plane is greater than 40 mm. The tire comprises at least three circumferential grooves, at least the central circumferential groove having an axial width L of less than 15 mm and a radial depth H which are such that the ratio of axial width L to radial depth H is between 0.1 and 0.3.

11 Claims, 2 Drawing Sheets

TIRE FOR CARRIER VEHICLE

RELATED APPLICATIONS

This is a U.S. National Phase Application under 35 USC 371 of International Application PCT/EP2007/054066, filed on Apr. 25, 2007.

This application claims the priority of French patent application no. 06/03768 filed Apr. 26, 2006, the subject matter of which is hereby incorporated by reference.

FIELD OF THE INVENTION

The invention relates to a tire for a goods handling vehicle and more specifically for a vehicle of the "straddle carrier" type that runs around ports and is intended for handling containers.

BACKGROUND OF THE INVENTION

Although not restricted to vehicles of the straddle carrier type, the invention will be described more specifically with reference to the tires with which these vehicles are equipped, as they have their own peculiar conditions of use. This type of vehicle is fitted with eight independent wheels which are mounted and set up independently, often causing the tires to drift sideways while the vehicle is in use.

The use of this type of vehicle is associated with shifting goods containers in ports. This use therefore corresponds to the shifting of heavy loads at low speeds usually of the order of 20 km/h.

The weight of the loads carried by this type of vehicle has led tire designers to develop special products which in particular have a relatively thick tread. This feature in particular avoids excessively rapid wear resulting from the loads being transported. Again on account of the weight of the loads being transported, the transverse grooves on the surface of the tread which is intended to come into contact with the ground have been abandoned in favor of circumferential grooves, particularly to avoid "saw-tooth" wear. Tires intended for this type of vehicle generally have two circumferential grooves dividing the tire tread into three circumferential regions or "ribs".

The circumferential direction of the tire, or longitudinal direction, is the direction corresponding to the periphery of the tire and defined by the direction in which the tire rolls.

The transverse or axial direction of the tire is parallel to the axis about which the tire turns.

The radial direction is the direction that intersects the axis of rotation of the tire and is perpendicular thereto.

The axis of rotation of the tire is the axis about which it turns during normal use.

A radial or meridian plane is a plane containing the axis of rotation of the tire.

The circumferential mid-plane or equatorial plane, is a plane perpendicular to the axis of rotation of the tire and which splits the tire into two halves.

Because current user demand is towards increasingly heavy loads being transported at ever higher speeds, it has been found that the tires may degrade under certain conditions of use. In particular, the tread may begin to delaminate when the loads being transported become excessive and are carried around at high speeds.

Phenomena such as this can be explained in particular as a result of the substantial thickness of the tread which causes the rubber masses to heat up a great deal as a result in particular of the phenomena of the tire flattening in the contact patch that is in contact with the ground and as a result of friction against the ground. Such heating leads to risks of break up, this phenomenon in particular being dependent on the load being transported and on the speeds at which the tires are being used.

SUMMARY OF THE INVENTION

An object of the invention is meeting current user demand and of providing tires for goods handling vehicles of the straddle carrier type which are capable of withstanding higher speeds and loads without sacrificing wear performance.

This and other objects are attained in accordance with an aspect of the invention directed to a radial tire for a handling vehicle, comprising a tread in which the thickness in the radial direction in the circumferential mid-plane is greater than 40 mm, the said tire comprising at least three circumferential grooves and at least the central circumferential groove having an axial width L of less than 15 mm and a radial depth H which are such that the ratio of axial width L to radial depth H is between 0.1 and 0.3.

Such a tire has demonstrated, in use on a vehicle of the straddle carrier type, that it is able to cover a longer distance than a conventional tire without the onset of damage. The presence of the central circumferential groove, advantageously in the circumferential mid-plane, appears to provide the tread with additional cooling thus preventing the kind of damage that appears on customary tires. The inventors have been able to demonstrate that the central groove, aside from providing additional cooling through its very presence, is of dimensions that are able to increase this cooling. Specifically, the dimensions of the central groove allow its two circumferential walls to move closer together and, as a result, to close up the said groove in the region of the contact patch. In other words, that part of the central groove that lies in the contact patch where the tire makes contact with the ground, disappears as the two walls thereof move closer together. This effect whereby the groove closes up causes air to be sucked into the entry region of the contact patch and air to be expelled from the exit region of the contact patch, thus encouraging air flow and therefore cooling of the tread.

According to a preferred embodiment of the invention, the axial width L of the groove is greater than 5 mm. For smaller groove widths, the additional cooling capability may prove insufficient for certain types of use.

According again to a preferred embodiment of the invention, the radial depth H of the tire is greater than 40 mm and preferably greater than 50 mm. Such depths further encourage the cooling of the tread.

According to an advantageous alternative form of the invention, the three circumferential grooves have the same axial width and radial depth properties. According to this alternative form of the invention, the three grooves therefore have dimensions such as those described above in respect of the central groove. The inventors have been able to demonstrate that the closing-up of the lateral grooves that then occurs in the region of the contact patch as explained hereinabove in respect of the central groove, aside from generating an air flow phenomenon, plays a part in combating tread wear on the shoulders of the tire; specifically, the closing-up of a lateral groove increases the transverse rigidity thus limiting the tire wear associated in particular with slippage in this region. As already stated, the tires of this type of vehicle are highly stressed sideways because, in particular, of the design of the vehicles and in particular of the difficulties of setting up on the vehicle, thus causing the lateral parts of the tread of these tires to wear. Improving the transverse rigidity in the region of the contact patch lessens these disadvantages.

Furthermore, the inventors have been able to demonstrate, contrary to current opinion, that reducing the width of the grooves by comparison with the customary tires for this type of use does not present any disadvantage particularly when running over wet ground because the speeds at which the vehicles travel are relatively low and the dimensions of the grooves according to the invention are still sufficient to remove the water.

According to a preferred embodiment of the invention, the two axially outermost grooves form broken lines. According to this embodiment, the lateral grooves are able to give the tread pattern a two-directional appearance and provide a minimum number of transverse edges providing braking capability and/or torque-transmitting ability on wet ground.

According to this preferred embodiment of the invention, the maximum axial distance between two points belonging to each wall of a groove respectively is advantageously less than 10 mm, particularly so as to maintain an improvement in transverse rigidity that is satisfactory for any type of use.

Advantageously, the grooves can form four circumferential regions or "ribs" of substantially equivalent widths. The tire thus designed has a symmetric tread pattern which encourages uniform cooling of the tread and increases the equivalent transverse rigidity on each side of the tire.

According to one advantageous embodiment of the invention, the circumferential regions or ribs formed by the grooves have transverse incisions starting from the wall that forms a groove. According to this embodiment of the invention, the incisions contribute to the part played by the grooves by spreading the phenomena whereby the rubbery mass tends to flow at the top of the circumferential grooves. The presence of such incisions can thus avoid the onset of groove edge wear resulting from these flow phenomena.

The tread may also have, particularly on the axially outermost circumferential regions or ribs, cavities distributed over the circumference of said ribs in order to contribute to the cooling of these parts of the tread. Cavities such as this are described for example in Document U.S. D 492,246 S.

BRIEF DESCRIPTION OF THE DRAWINGS

Further details and advantageous features of the invention will become evident hereinafter from the description of some exemplary embodiments of the invention made with reference to FIGS. 1 and 2 which depict.

DETAILED DESCRIPTION OF THE DRAWINGS

In order to make them easier to interpret, the figures have not been drawn to scale.

Figure 1:
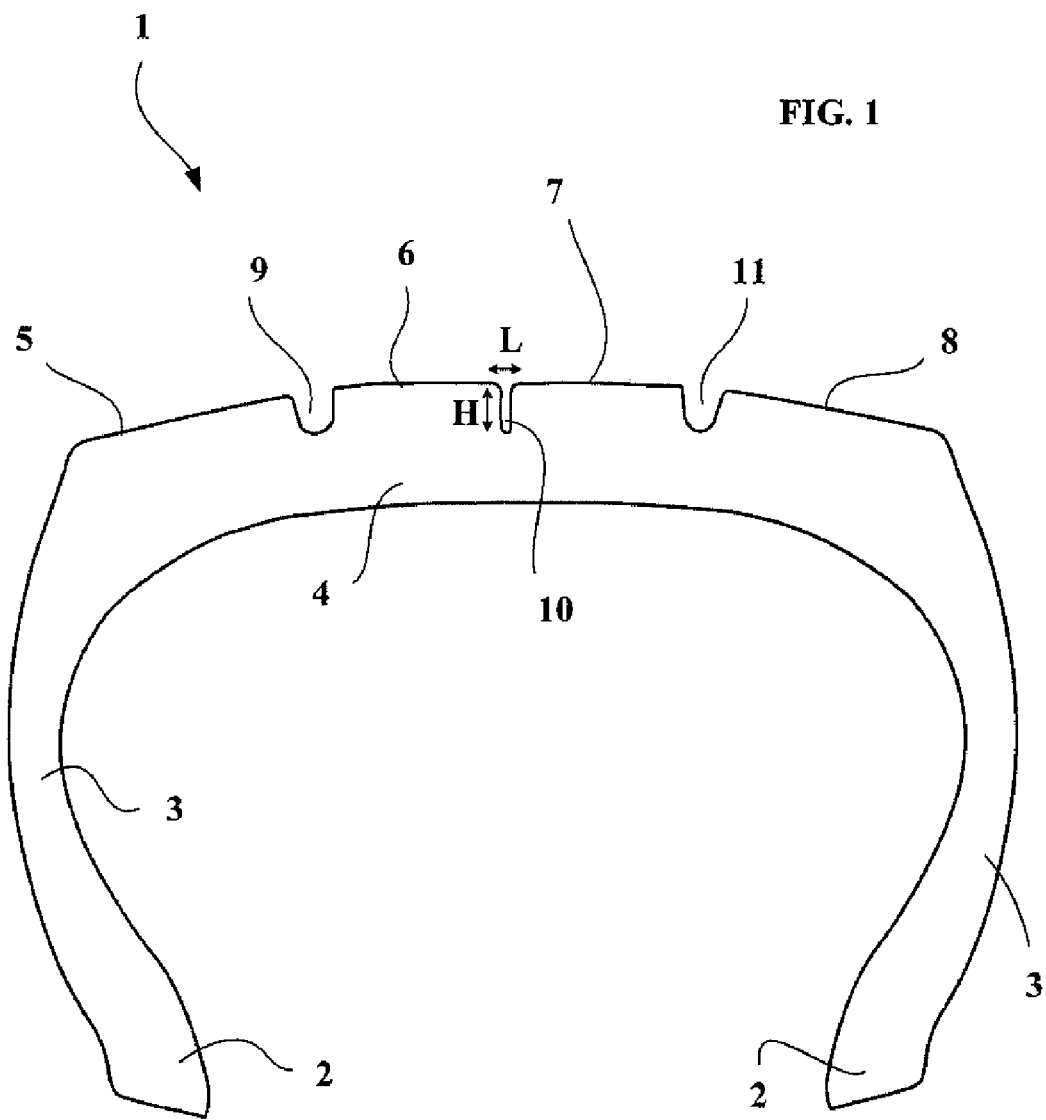
FIG. 1: a schematic depiction of a tire according to a first embodiment of the invention.

FIG. 1 depicts a diagram, seen in radial section of a tire 1 produced according to the invention. The tire 1 comprises two beads 2 intended to be mounted on bead seats of a rim. Each bead 2 is extended radially outwards by a side wall 3, the said side wall 3 meeting the tread 4 of the said tire 1 radially towards the outside. The tread 4 of the tire 1 is divided on its exterior surface into four circumferential strips or ribs 5, 6, 7, 8 separated by three grooves 9, 10, 11.

The two axially outermost grooves 9, 11 have the customary dimensions for this type of tire and have an axial width of about 35 mm. The central groove 10, which is created in the circumferential mid-plane, according to the invention has an axial width 1 equal to 10 mm. Its step H is 50 mm and the ratio L/H is thus equal to 0.2.

A tire produced according to FIG. 1 was tested on a vehicle of the straddle carrier type, this vehicle running under normal conditions, that is to say transporting heavy loads corresponding to the weights of containers at speeds of below 30 km/h. This tire testing according to the invention was carried out by comparison against identical running by fitting the same straddle carrier type vehicle with conventional tires, that is to say with tires that have only the two axially outermost grooves 9 and 11. The testing thus performed demonstrated that the tire produced according to the invention was able to travel longer distances without the onset of damage whereas the customary tire revealed the onset of deterioration to the tread.

The inventors have been able to demonstrate that this deterioration of the tire was due to heating of the tread and more specifically of the central part of the tire. The testing thus performed demonstrated that an embodiment according to the invention therefore improved the endurance properties of the tire. It thus appears to confirm that the groove 10 provided in the circumferential mid-plane provides the tread with additional cooling which therefore, for the conditions of use of a vehicle of a straddle carrier type, increases the life of the tire. The dimension of the groove 10 as per the features of the invention is able, aside from increasing the heat exchange area, to create a phenomenon whereby air is drawn in/expelled, as described earlier, in the region of the contact patch, thus contributing to better air flow and enhanced cooling.

The difference between the distance covered by a tire according to the invention and the distance covered by a customary tire may be very marked. Specifically, the conditions in which this type of vehicle is used often leads to the tire becoming damaged before it has suffered the normal type of wear on account of the increase in temperature of the tread. The tire solution thus proposed by the invention is able to avoid such increases in temperature and therefore allows the tire to be preserved until it becomes completely worn without the tire suffering damage beforehand.

Figure 2:
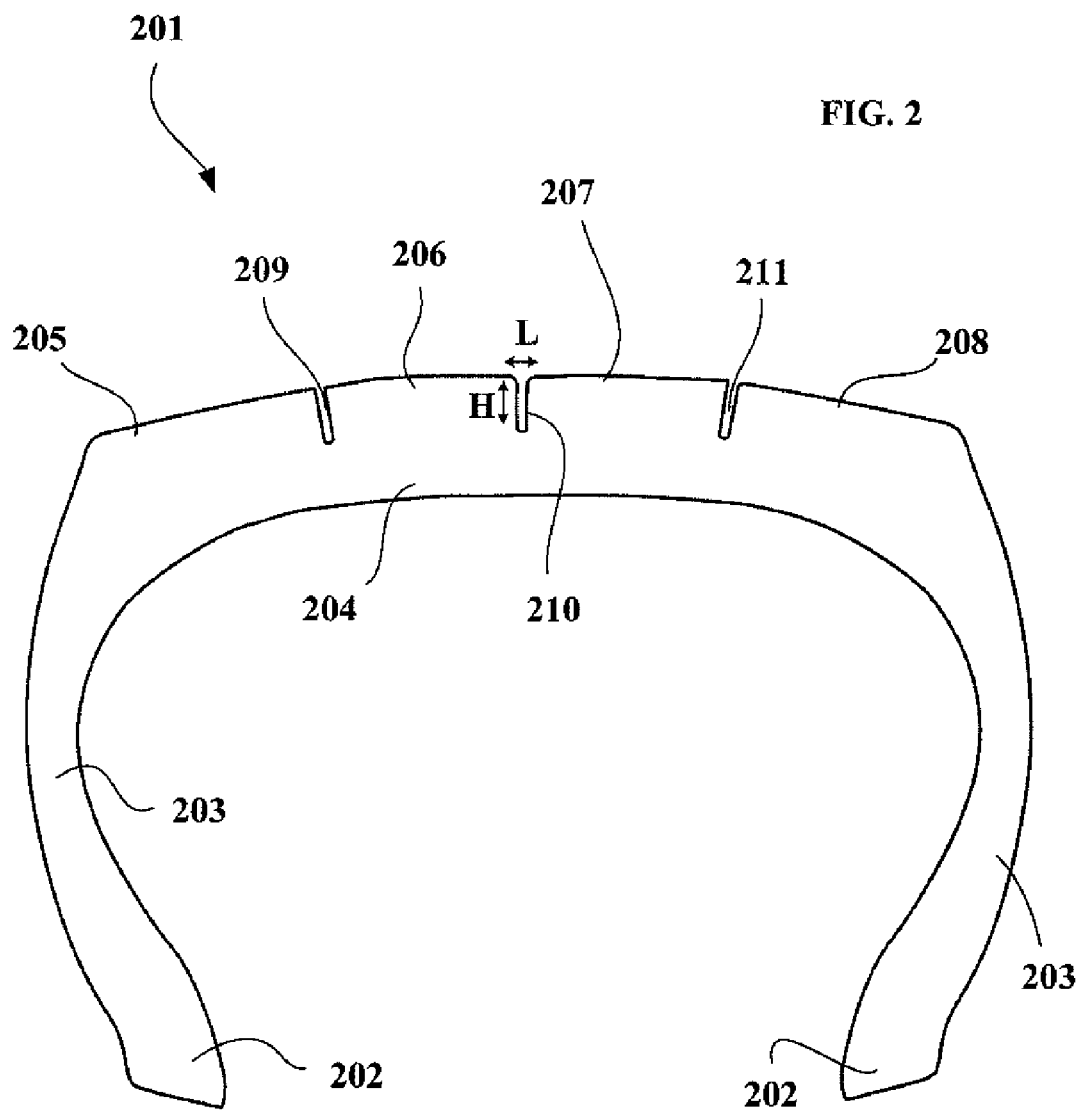
FIG. 2: a schematic depiction of a tire according to a second embodiment of the invention.

FIG. 2 depicts a diagram viewed in radial section, of a tire 201 produced according to the invention. The tire 201 differs from the tire 1 of FIG. 1 through the presence of three grooves 209, 210, 211 of identical dimensions.

The presence of the axially outermost grooves 209, 211, of dimensions smaller than those usually employed for this type of tire, will also contribute to better tread cooling, particularly as a result of the phenomenon already described whereby air is drawn in and expelled.

Furthermore, these grooves 209, 211 and, more specifically, the dimensions thereof, because the walls of the grooves can move closer together as the grooves go through the contact patch, increase particularly the lateral rigidity of the tread.

Testing carried out has demonstrated that this increase in lateral rigidity through the contact patch where the tire is in contact with the ground limits wear on the axially outermost parts of the tread.

Comparisons under identical conditions of use against conventional tires or alternatively against tires according to the depiction of FIG. 1 have actually demonstrated that wear on the axially outermost parts of the tread is less substantial in the case of the tires produced in accordance with this depiction of FIG. 2.

This reduction in the wear on the axially outermost parts of the tread also plays a part in limiting increases in temperature of the central part of the tread by allowing the tire to maintain a load and pressure distribution over its entire axial width in the region of the contact patch.

Testing has further demonstrated another advantage of the axially narrow grooves according to the invention: the comparison against customary tires has demonstrated a reduced risk of attack to the inside of the tread pattern leading to punctures. Such punctures are, for example, due to metal debris capable of cutting into the tires, the said debris generally originating from the containers which are moved around and stored at the ports. What happens is that the narrow width of the said grooves and the fact that these grooves close up in the region of the contact patch avoids or at least limits such attacks.

The invention claimed is:

1. A radial tire for a handling vehicle, comprising:
   a tread in which the thickness in the radial direction in the circumferential mid-plane is greater than 40 mm; and
   at least three circumferential grooves, including a central circumferential groove,
   wherein at least the central circumferential groove has an axial width L of less than 15 mm and a radial depth H which are such that the ratio of axial width L to radial depth H is between 0.1 and 0.3, and
   wherein the axial width L is greater than 5 mm.

2. The tire according to claim 1, wherein the radial depth H is greater than 40 mm.

3. The tire according to claim 1, wherein the three circumferential grooves have the same axial width and radial depth properties.

4. The tire according to claim 1, wherein the two axially outermost grooves form broken lines.

5. The tire according to claim 4, wherein the maximum axial distance between two points belonging to each wall of a groove respectively is less than 10 mm.

6. The tire according to claim 1, wherein the grooves form four circumferential regions or "ribs" of substantially equivalent widths.

7. The tire according to claim 1, wherein the circumferential regions or ribs formed by the grooves have transverse incisions starting from the wall that forms a groove.

8. The tire according to claim 1, wherein the axially outermost circumferential regions or ribs have cavities.

9. The tire according to claim 1, wherein the radial depth H is greater than 50 mm.

10. A radial tire for a handling vehicle, comprising:
    a tread in which the thickness in the radial direction in the circumferential mid-plane is greater than 40 mm; and
    at least three circumferential grooves, including a central circumferential groove,
    wherein at least the central circumferential groove has an axial width L of less than 15 mm and a radial depth H which are such that the ratio of axial width L to radial depth H is between 0.1 and 0.3, and
    wherein the radial depth H is greater than 40 mm.

11. A radial tire for a handling vehicle, comprising:
    a tread in which the thickness in the radial direction in the circumferential mid-plane is greater than 40 mm; and
    at least three circumferential grooves, including a central circumferential groove,
    wherein at least the central circumferential groove has an axial width L of less than 15 mm and a radial depth H which are such that the ratio of axial width L to radial depth H is between 0.1 and 0.3, and
    wherein the radial depth H is greater than 50 mm.

* * * * *